(12) United States Patent
Takahashi et al.

(10) Patent No.: US 9,491,787 B2
(45) Date of Patent: *Nov. 8, 2016

(54) WIRELESS COMMUNICATION APPARATUS, WIRELESS COMMUNICATION METHOD, NON-TRANSITORY COMPUTER-READABLE RECORDING MEDIUM, MASTER, AND SLAVE

(71) Applicant: CASIO COMPUTER CO., LTD., Shibuya-ku, Tokyo (JP)

(72) Inventors: Toshihiro Takahashi, Kunitachi (JP); Takahiro Tomida, Hamura (JP); Tsutomu Terazaki, Saitama (JP); Ryo Okumura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,126

(22) Filed: Dec. 2, 2014

(65) Prior Publication Data

US 2015/0173110 A1  Jun. 18, 2015

(30) Foreign Application Priority Data

Dec. 16, 2013 (JP) ................ 2013-259441

(51) Int. Cl.

| H04W 76/02 | (2009.01) |
|---|---|
| H04W 4/00 | (2009.01) |
| H04W 72/04 | (2009.01) |
| H04W 74/00 | (2009.01) |
| H04W 84/20 | (2009.01) |

(52) U.S. Cl.
CPC ............ *H04W 76/02* (2013.01); *H04W 4/008* (2013.01); *H04W 72/0453* (2013.01); *H04W 74/002* (2013.01); *H04W 84/20* (2013.01)

(58) Field of Classification Search
CPC combination set(s) only.
See application file for complete search history.

(56) References Cited

U.S. PATENT DOCUMENTS

| 8,745,246 B2 | 6/2014 | Yamaguchi |
| 8,804,677 B2 | 8/2014 | Corson et al. |

(Continued)

FOREIGN PATENT DOCUMENTS

| JP | 2009523378 A | 6/2009 |
| JP | 2011199408 A | 10/2011 |

(Continued)

OTHER PUBLICATIONS

Japanese Office Action (and English translation thereof) dated Sep. 29, 2015, issued in counterpart Japanese Application No. 2013-259441.

*Primary Examiner* — Cindy Trandai
(74) *Attorney, Agent, or Firm* — Holtz, Holtz & Volek PC

(57) ABSTRACT

When the first connection is established with a slave, the master determines one channel selected from three advertising channels, as a channel used for establishment of the subsequent connection with the slave, and notifies the slave of the one channel. When the first connection is established with the master, the slave transmits an advertise in the three advertising channels. Further, when the second or subsequent connection is established with the master, the slave transmits the advertise in the one channel notified of from the master.

12 Claims, 10 Drawing Sheets

(56) References Cited

U.S. PATENT DOCUMENTS

| | | | | |
|---|---|---|---|---|
| 2008/0037570 A1* | 2/2008 | Kim | ............... | H04W 52/0225 370/406 |
| 2009/0138547 A1* | 5/2009 | Boudreau | ............... | H04W 4/08 709/203 |
| 2010/0317289 A1* | 12/2010 | Desai | ............... | H04B 17/318 455/41.2 |
| 2011/0021142 A1* | 1/2011 | Desai | ............... | H04W 8/005 455/41.2 |
| 2012/0052802 A1* | 3/2012 | Kasslin | ............... | H04W 48/12 455/41.2 |
| 2012/0083210 A1* | 4/2012 | Cutrignelli | ............... | H04W 84/20 455/41.2 |
| 2012/0147777 A1 | 6/2012 | Arashin et al. | | |
| 2012/0196534 A1* | 8/2012 | Kasslin | ............... | H04W 76/002 455/41.2 |
| 2013/0188538 A1* | 7/2013 | Kainulainen | ............... | G01S 5/04 370/310 |
| 2014/0378056 A1* | 12/2014 | Liu | ............... | H04W 4/008 455/41.2 |

FOREIGN PATENT DOCUMENTS

| | | |
|---|---|---|
| JP | 2012142877 A | 7/2012 |
| WO | 2007082246 A1 | 7/2007 |
| WO | 2011161951 A1 | 12/2011 |

\* cited by examiner

FIG. 2

| RF CENTER FREQUENCY [MHz] | DATA CHANNEL INDEX | ADVERTISING CHANNEL INDEX |
|---|---|---|
| 2402 | | 37 |
| 2404 | 0 | |
| 2406 | 1 | |
| 2408 | 2 | |
| 2410 | 3 | |
| ⋮ | ⋮ | ⋮ |
| 2422 | 9 | |
| 2424 | 10 | |
| 2426 | | 38 |
| 2428 | 11 | |
| 2430 | 12 | |
| ⋮ | ⋮ | ⋮ |
| 2476 | 35 | |
| 2478 | 36 | |
| 2480 | | 39 |

FREQUENCY RANGE TABLE

| SLAVE ID | CHANNEL (INDEX) |
|---|---|
| 200a | 37 |
| 200c | 38 |

FIG. 10A

FREQUENCY RANGE TABLE 171

| SLAVE ID | USE TIME ZONE | CHANNEL (INDEX) |
|---|---|---|
| 200a | AM9:00 TO AM12:00 | 37 |
| 200b | AM9:00 TO AM12:00 | 38 |
| 200c | PM3:00 TO PM6:00 | 37 |
| 200d | PM9:00 TO PM12:00 | 39 |

FIG. 10B

FREQUENCY RANGE TABLE 171

| SLAVE ID | USE TIME ZONE | CHANNEL (INDEX) |
|---|---|---|
| 200a | AM9:00 TO AM12:00 | 37 |
| 200b | AM9:00 TO AM12:00 | 38 |
| 200c | PM3:00 TO PM6:00 | 37 |
| 200d | PM9:00 TO PM12:00 | 39 |
| 200e | PM3:00 TO PM6:00 | 38 |
| 200f | PM3:00 TO PM6:00 | 39 |

WIRELESS COMMUNICATION APPARATUS, WIRELESS COMMUNICATION METHOD, NON-TRANSITORY COMPUTER-READABLE RECORDING MEDIUM, MASTER, AND SLAVE

BACKGROUND

1. Technical Field

The present invention relates to a wireless communication apparatus, a wireless communication method, a non-transitory computer-readable recording medium, a master, and a slave.

2. Related Art

A master is a wireless communication device performing wireless communication based on Bluetooth (registered trademark) low energy being a short range wireless communication standard.

The master receives identification information called an advertise periodically transmitted by a slave being another wireless communication device as a communication partner, and transmits a connection request to the slave, before data is transmitted and received between the master and the slave (e.g., see JP 2012-142877 A).

SUMMARY

As described above, in a wireless communication device for performing wireless communication based on the Bluetooth (registered trademark) low energy, the slave uses three channels for an advertise. The three channels are selected from 40 channels in frequency ranges to be assigned for the advertise beforehand.

However, when the advertise is transmitted always using the three channels, unnecessary power consumption is generated upon communication between a specific slave and the master.

The present invention has been made in view of such a problem, and it is an object of the present invention to provide a wireless communication apparatus, a wireless communication method, a non-transitory computer-readable recording medium, a master, and a slave for reducing the unnecessary power consumption.

In order to achieve the above objects, according to a first aspect of the present invention, there is provided a wireless communication apparatus for performing wireless communication with another wireless communication apparatus, the wireless communication apparatus including:

a first connection establishment unit configured to receive identification information from the another wireless communication apparatus configured to transmit the identification information in predetermined N frequency ranges (N is a natural number equal to or more than 2 and less than the number of frequency ranges for communication), and establish connection with the another wireless communication apparatus;

a frequency range determination unit configured to determine M frequency ranges (M is a natural number less than N) from among the predetermined N frequency ranges, as a frequency range used for establishment of subsequent connection with the another wireless communication apparatus, after the connection with the another wireless communication apparatus has been established by the first connection establishment unit;

a frequency range notification unit configured to notify the another wireless communication apparatus of the frequency range, the another wireless communication apparatus having the connection established by the first connection establishment unit, the frequency range having been determined by the frequency range determination unit; and a second connection establishment unit configured to receive the identification information from the another wireless communication apparatus in the frequency range having been determined by the frequency range determination unit, and establish the connection with the another wireless communication apparatus.

According to an embodiment of the present invention, unnecessary power consumption is reduced.

BRIEF DESCRIPTION OF THE DRAWINGS

FIG. 2 is a table illustrating assignment of frequency ranges in wireless communication based on Bluetooth (registered trademark) low energy;

FIG. 4 is a diagram illustrating exemplary data stored in a frequency range table;

FIG. 10A is an exemplary table illustrating data stored in a frequency range table; and FIG. 10B is an exemplary table illustrating data stored in the frequency range table.

DETAILED DESCRIPTION

An embodiment of the present invention will be described below with reference to the drawings.

Figure 1:
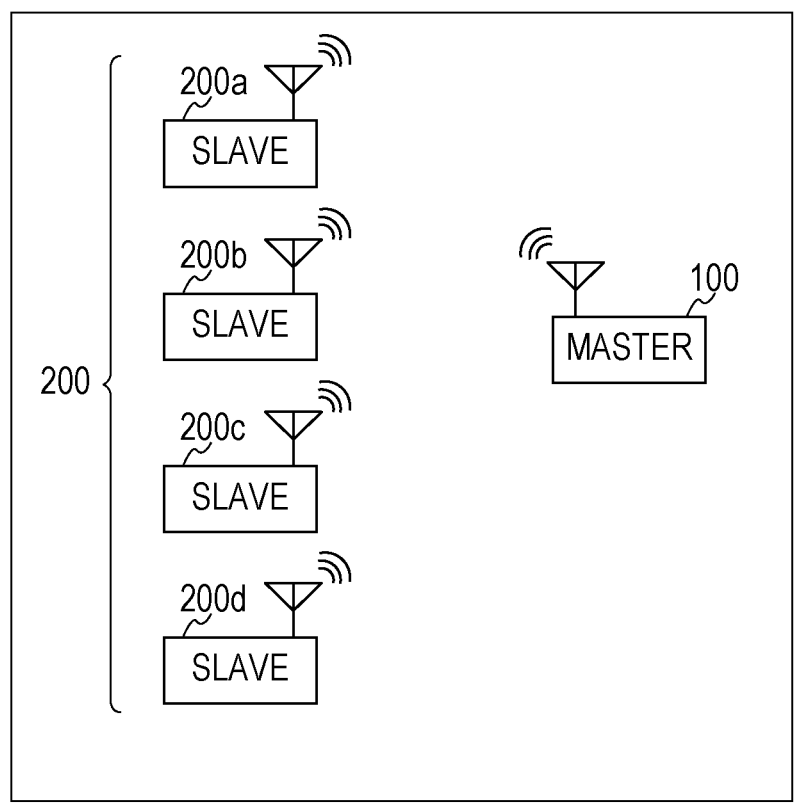
FIG. 1 is a diagram illustrating an exemplary configuration of a wireless communication system according to an embodiment of the present invention.

FIG. 1 is a diagram illustrating an exemplary configuration of a wireless communication system according to an embodiment of the present invention.

In an exemplary configuration of FIG. 1, a wireless communication system 1 includes a master 100 serving as a wireless communication apparatus, and a plurality of slaves 200 (200a to 200d) different from the master 100 and serving as wireless communication apparatuses.

The master 100 and the slaves 200 wirelessly communicates with each other based on Bluetooth (registered trademark) low energy (hereinafter, referred to as BLE).

BLE represents a standard (mode) developed for low power consumption in a short range wireless communication standard which is called Bluetooth (registered trademark).

The master 100 is an apparatus using a service (e.g., measured data) provided from the slave 200.

Further, the slave 200 is an apparatus for providing the service (e.g., measured data) to the master 100.

The master 100 is a portable terminal, such as a mobile phone, a smartphone, a tablet personal computer, a notebook personal computer, having a wireless communication function based on BLE.

In the present embodiment, as an example, the master 100 includes a smartphone.

The master 100 receives various data from the slave 200, and displays various information on a display unit 128 mentioned below, or emits alarm sound or the like from a speaker 124 mentioned below based on the received data.

The slave 200 notifies the master 100 of a summary of service of its own, and transmits an advertise for waiting for a connection request from the master 100.

In the wireless communication performed based on BLE, before the data is transmitted and received between the master 100 and the slave 200, the slave 200 transmits the advertise, and the master 100 receives the advertise.

The advertise represents identification information for notifying another wireless communication apparatus of the presence of its own identification in order to search for the another wireless communication apparatus or connect to the another wireless communication apparatus.

In the present embodiment, the slave 200 transmits the advertise to the master 100.

Here, description will be made of a frequency range (channel) of the advertise transmitted by the slave 200.

FIG. 2 represents a table illustrating assignment of frequency ranges to the channels in BLE.

As illustrated in FIG. 2, in BLE, a frequency band of 2400 MHz to 2483.5 MHz is divided into 40 channels having a bandwidth of 2 MHz for use.

Three advertising channels (channels having advertising channel indexes of 37, 38, and 39, respectively) having intermediate frequencies (RF center frequencies) of 2402 MHz, 2426 MHz, and 2480 MHz, selected from among the 40 channels, are used for the advertise.

The remaining 37 data communication channels (channels having data channel indexes of 0 to 36, respectively) are used for data communication after connection has been established between the master 100 and the slave 200.

In conventional wireless communication based on BLE, a slave always uses three channels for an advertise.

On the other hand, the slave 200 according to the present embodiment uses, for the advertise, one channel selected from the three channels upon second or subsequent connection with the master 100.

Next, description will be made of a hardware configuration or the like of the communication system 1 according to the present embodiment.

Figure 3:
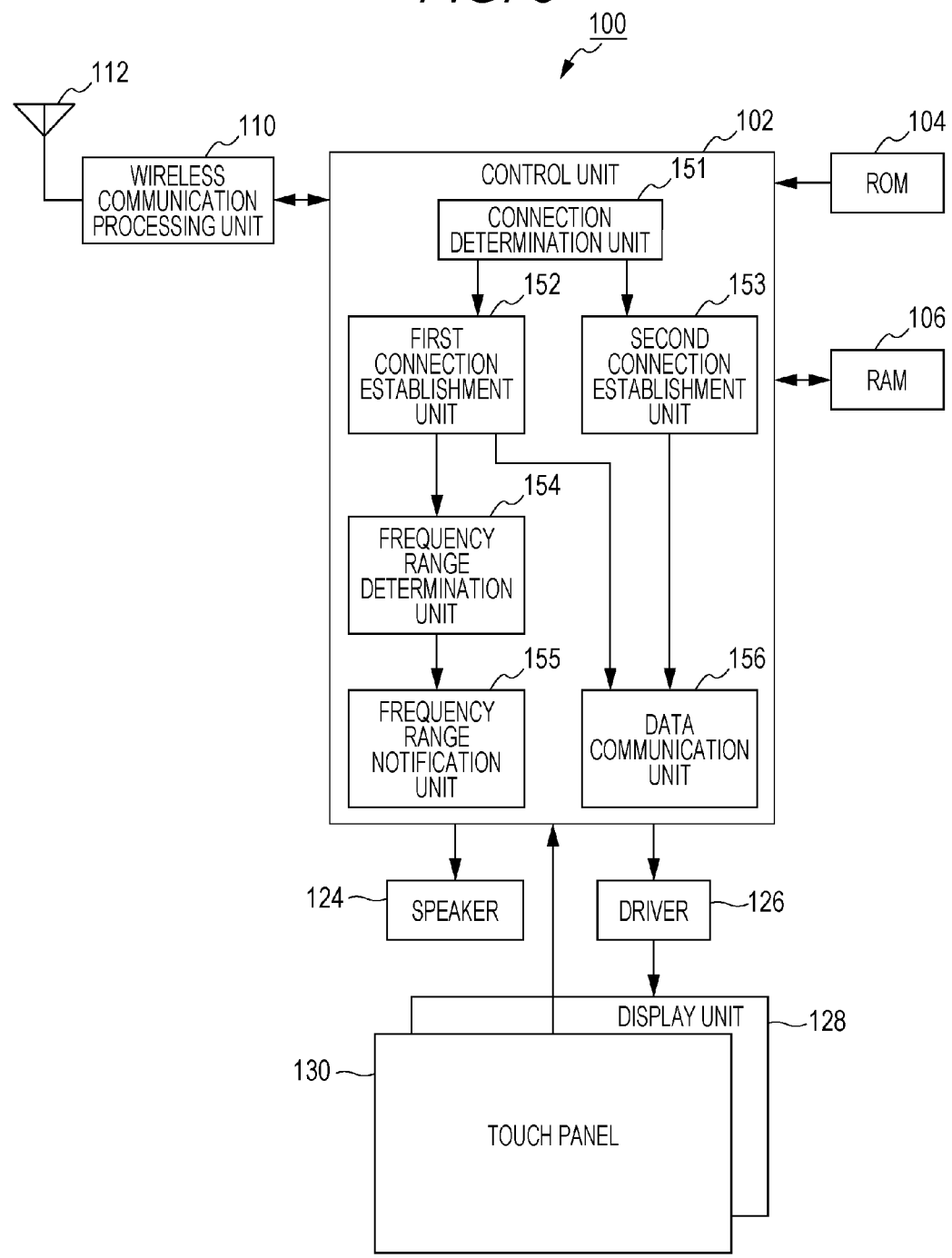
FIG. 3 is a diagram illustrating an exemplary configuration of a master according to the embodiment of the present invention.

FIG. 3 is a schematic block diagram illustrating an exemplary configuration of the master 100 according to the present embodiment.

As illustrated in FIG. 3, the master 100 as a communication terminal includes a control unit 102, a read only memory (ROM) 104, a random access memory (RAM) 106, a wireless communication processing unit 110, an antenna 112, a speaker 124, a driver 126, a display unit 128, and a touch panel 130.

The control unit 102 includes, for example, a central processing unit (CPU). The control unit 102 performs software processing according to a program (e.g., program for achieving operation of master 100 in FIG. 7, described later) stored in the ROM 104 to control various functions of the master 100.

ROM 104 includes a non-volatile memory such as a flash memory, and stores a program or data for controlling the various functions by the control unit 102, as described above.

The RAM 106 includes a volatile memory, and is used as a work area for temporarily storing data for various processing of the control unit 102.

The wireless communication processing unit 110 uses, for example, a radio frequency (RF) circuit or a baseband (BB) circuit.

The wireless communication processing unit 110 transmits and receives, based on BLE, a wireless signal through the antenna 112.

The speaker 124 outputs a sound such as alarm sound based on sound data from the control unit 102.

The driver 126 outputs, to the display unit 128, an image signal based on image data output from the control unit 102.

The display unit 128 includes, for example, a liquid crystal display (LCD) or an electroluminescence (EL) display.

The display unit 128 displays an image according to the image signal output from the driver 126.

The touch panel 130 is an interface disposed on the upper surface of the display unit 128, and used for receiving user input.

The touch panel 130 includes for example a transparent electrode not illustrated, detects, as a contact position, a position where voltage is changed when the user's finger or the like makes contact with the touch panel, and outputs, as an input instruction, information about the contact position to the control unit 102.

Next, description will be made of a functional configuration of the control unit 102 of the master 100.

As illustrated in FIG. 3, the control unit 102 functions as a connection determination unit 151, a first connection establishment unit 152, a second connection establishment unit 153, a frequency range determination unit 154, a frequency range notification unit 155, and a data communication unit 156.

The connection determination unit 151 obtains, as an instruction for connection with the slave 200, user operation to the touch panel 130 for starting communication, for example, after application is started for communicating with the slave 200.

It is noted that the connection instruction is not limited to be generated by the user's operation, and may be generated based on passage of a predetermined time on a timer, for example, after application for measuring environmental information is started.

The connection determination unit 151 determines whether the master 100 has a previous connection with the slave 200 specified by the connection instruction.

Specifically, the connection determination unit 151 references a frequency range table recorded in the ROM 104, and determines whether the connection has been made with the slave 200, based on whether identification information of the slave 200 specified by the connection instruction is recorded in the frequency range table.

In FIG. 4, an exemplary frequency range table 161 is illustrated. The frequency range table 161 illustrated in FIG. 4 stores the identification information (slave ID) of the slave 200 and an index of the channel used for communication with the slave 200, in association with each other.

The information is stored in the frequency range table 161 by the frequency range determination unit 154, as described below.

The connection determination unit 151 references the frequency range table 161, and for example when the slave 200 specified by the connection instruction is defined as a slave 200a, a slave ID "200a" of the slave 200a is stored in the frequency range table 161, so that the connection determination unit 151 determines that the master 100 has a previous connection with the slave 200a.

Further, for example, when the slave 200 specified by the connection instruction is defined as slave 200b, a slave ID "200b" of the slave 200b is not stored in the frequency range table 161, so that the connection determination unit 151 determines that the master 100 does not have a previous connection with the slave 200b.

The first connection establishment unit 152 establishes connection with the slave 200 which is determined to have no previous connection therewith by the connection determination unit 151.

Specifically, when the first connection establishment unit 152 is determined, by the connection determination unit 151, to have no previous connection with the slave 200 specified by the connection instruction, the first connection establishment unit 152 waits for and receives the advertise from the slave 200 at the three advertising channels of FIG. 2.

And then, the first connection establishment unit 152 transmits the connection request to the slave 200, and establishes the connection with the slave 200.

The second connection establishment unit 153 establishes connection with the slave 200 which is determined to have the previous connection therewith by the connection determination unit 151.

Specifically, when the second connection establishment unit 153 is determined, by the connection determination unit 151, to have the previous connection with the slave 200 specified by the connection instruction, the second connection establishment unit 153 waits for and receives the advertise from the slave 200 at the channel selected from the three advertising channels of FIG. 2, and stored in the frequency range table 161 of FIG. 4 in association with the slave 200.

And then, the second connection establishment unit 153 transmits the connection request to the slave 200, and establishes the connection with the slave 200.

After establishment of the connection with the slave 200 by the first connection establishment unit 152, the frequency range determination unit 154 determines one of the three advertising channels of FIG. 2, as the frequency range used for establishment of subsequent connection with the slave 200.

In the present embodiment, as an example of a channel determination method, the frequency range determination unit 154 is configured to determine one channel of the three channels at random.

The frequency range determination unit 154 records the determined channel and the slave 200 with which the connection has been established by the first connection establishment unit 152, in the frequency range table 161 of FIG. 4.

Therefore, the frequency range table 161 stores the slave 200 having established previous connection with the master 100, and the channel determined by the frequency range determination unit 154, in association with each other.

The frequency range notification unit 155 transmits notification of the channel having been determined by the frequency range determination unit 154 to the slave 200 with which the connection has been established by the first connection establishment unit 152.

The slave 200 having been received the notification of the channel transmitted by the frequency range notification unit 155 records the received notification of the channel in a storage unit of itself.

And then, the slave 200 transmits the advertise through the channel having been recorded for subsequent connection with the master 100.

After the connection with the slave 200 has been established by the first connection establishment unit 152 or the second connection establishment unit 153, the data communication unit 156 performs data communication with the slave 200 through the 37 data communication channels of FIG. 2.

Figure 5:
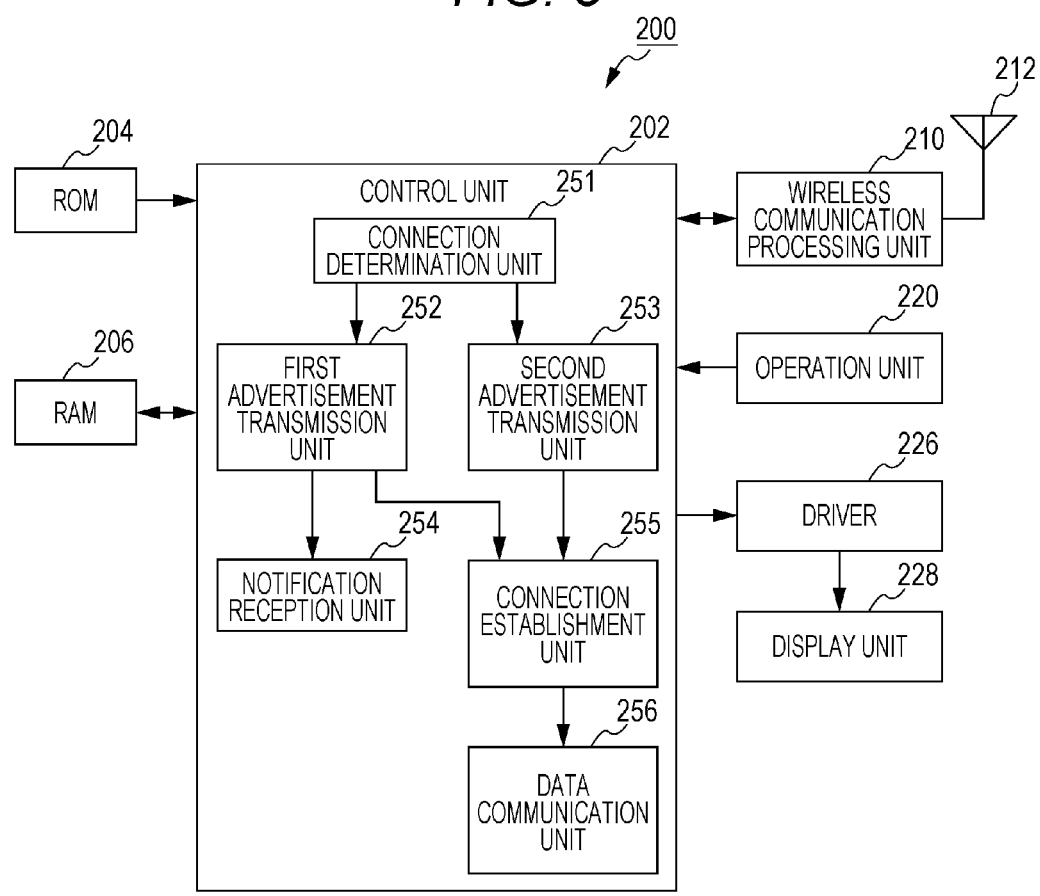
FIG. 5 is a diagram illustrating an exemplary configuration of a slave according to the embodiment of the present invention.

FIG. 5 is a schematic block diagram illustrating an exemplary configuration of the slave 200 according to the present embodiment.

As illustrated in FIG. 5, the slave 200 includes a control unit 202, a ROM 204, a RAM 206, a wireless communication processing unit 210, an antenna 212, an operation unit 220, a driver 226, and a display unit 228.

The control unit 202 includes for example a CPU.

The control unit 202 performs software processing according to a program (e.g., below-mentioned program of FIG. 8 for achieving operation of slave 200) stored in the ROM 204, and controls various functions of the slave 200.

The ROM 204 includes a non-volatile memory such as a flash memory, and stores the program or data for controlling the various functions by the control unit 202, as described above.

The RAM 206 includes a volatile memory, and is used for a work area for temporarily storing data for performing various processing by the control unit 202.

The wireless communication processing unit 210 includes for example a radio frequency (RF) circuit or a baseband (BB) circuit.

The wireless communication processing unit 210 transmits or receives, based on BLE, a wireless signal through the antenna 212.

The operation unit 220 includes for example a switch, and is used for receiving user input, such as turning power on and off.

The driver 226 outputs, to the display unit 228, an image signal based on image data output from the control unit 202.

The display unit 228 includes, for example, an LCD or an EL display. The display unit 228 displays an image according to the image signal output from the driver 226.

Next, description will be made of a functional configuration of the control unit 202 of the slave 200.

As illustrated in FIG. 5, the control unit 202 functions as a connection determination unit 251, a first advertise transmission unit 252, a second advertise transmission unit 253, a notification reception unit 254, a connection establishment unit 255, and a data communication unit 256.

When an instruction for connection with the master 100 is obtained, the connection determination unit 251 determines whether the slave 200 has previously established connection with the master 100.

Specifically, the connection determination unit 251 determines the previous connection with the master 100 based on whether the channel used for the advertise transmitted to the destination master 100 is recorded in the ROM 204.

As described below, the channel recorded in the ROM 204 is the channel contained in notification transmitted from the master 100 and received by the notification reception unit 254, when the previous connection with the master 100 has been established.

When the ROM 204 records the frequency range, the connection determination unit 251 determines that the slave 200 has the previous connection with the master 100.

On the other hand, when the ROM 204 does not record the frequency range, the connection determination unit 251 determines that the slave 200 does not have the previous connection with the master 100.

The first advertise transmission unit 252 corresponds to a first identification information transmission unit, and transmits the advertise to the master 100 determined to have no previous connection by the connection determination unit 251, through the three advertising channels of FIG. 2.

The second advertise transmission unit 253 corresponds to a second identification information transmission unit, and transmits the advertise to the master 100 determined to have the previous connection by the connection determination unit 251, through one channel recorded in the ROM 104.

The notification reception unit 254 receives notification specifying the one channel selected from the three advertising channels of FIG. 3, from the master 100 having received the advertise transmitted from the first advertise transmission unit 252.

The notification reception unit 254 records, in the ROM 204, the received channel as the channel used for subsequent advertises to the master 100.

The connection establishment unit 255 receives the connection request transmitted from the master 100 having received the advertise transmitted by the first advertise transmission unit 252 or the second advertise transmission unit 253, and establishes the connection with the master 100.

After the connection with the master 100 has been established by the connection establishment unit 255, the data communication unit 256 performs data communication with the master 100 through the 37 data communication channels of FIG. 2.

Next, operation of the wireless communication system 1 according to the present embodiment will be described with reference to a flowchart of FIG. 6.

Figure 6:
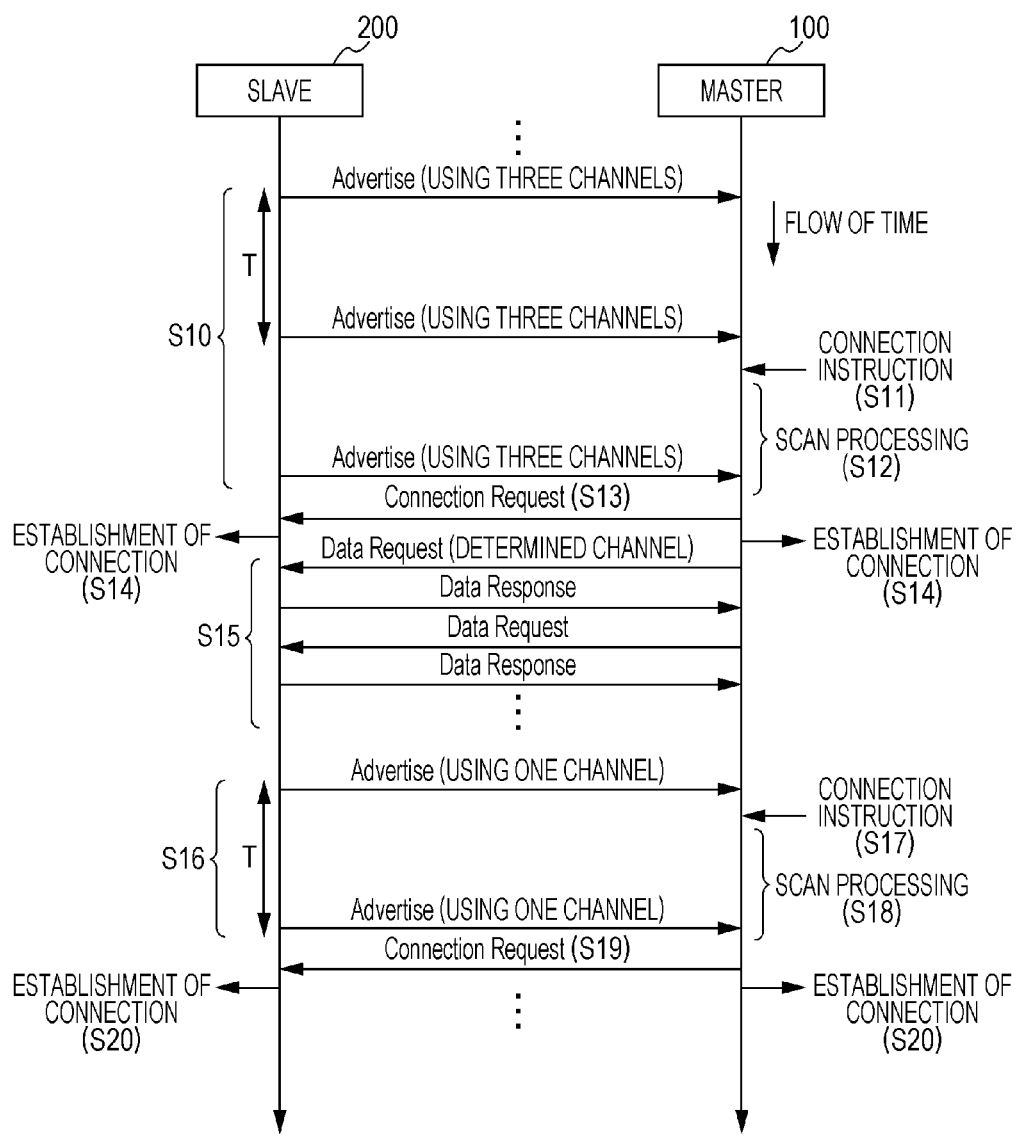
FIG. 6 is a diagram for description of operation of the wireless communication system of FIG. 1.

When the slave 200 attempts to connect with the master 100 with which previous connection is not established, the advertise is periodically transmitted to the master 100 at time intervals T, using the three advertising channels of FIG. 2, as illustrated in FIG. 6 (step S10).

The master 100 accepts, for example, operation by the user to the touch panel 130, as the instruction for connection with the slave 200 (step S11), and performs scan processing for receiving the advertise from the slave 200 (step S12).

In this scan processing, the master 100 determines to have no previously established connection with the slave 200 with which communication is to be started, and scans the advertise using the three advertising channels.

The master 100 transmits the connection request to the slave 200 having transmitted the advertise, when receiving the advertise from the slave 200 (step S13).

Thus, connection processing is performed in the master 100 and the slave 200, and the connection is established (step S14).

After the connection is established between the master 100 and the slave 200, the master 100 and the slave 200 transmit and receive data between them (step S15).

The transmission and reception of the data is performed by transmitting a data request from the master 100 to the slave 200, and returning a data response from the slave 200 to the master 100.

In the transmission and reception of the data in step 16, the master 100 determines one channel from the three advertising channels, as the channel used for establishment of the subsequent connection with the slave 200 being in connection.

The master 100 notifies the slave 200 of the determined channel. The slave 200 records the channel having been received from the master 100 to use the channel for the subsequent connection.

The master 100 also records the determined channel to use the channel for the subsequent connection with the slave 200.

When the transmission and reception of the data between the master 100 and the slave 200 ends, the master 100 and the slave 200 performs disconnection processing, and the connection ends.

When the slave 200 attempts to connect with the master 100 after the first connection has been made between the master 100 and the slave 200, as described above, the one channel having been notified of from the master 100 upon the first connection is used to periodically transmits the advertise to the master 100 at the time intervals T, as illustrated in FIG. 6 (step S16).

When the master 100 receives the connection instruction, as in step S11 (step S17), the scan processing is performed for receiving the advertise from the slave 200 (step S18).

In the scan processing, the master 100 determines that the master has previous connection with the slave 200 with which communication is to be started, and scans the advertise using the recorded one advertising channel.

When the master 100 receives the advertise from the slave 200, the connection request is transmitted to the slave 200 having transmitted the advertise (step S19).

Therefore, the connection processing is performed in the master 100 and the slave 200, and the connection is established (step S20).

Subsequent transmission and reception of the data is performed similarly to step S15.

Next, operation of the master 100 according to the present embodiment will be described with reference to FIG. 7.

Figure 7:
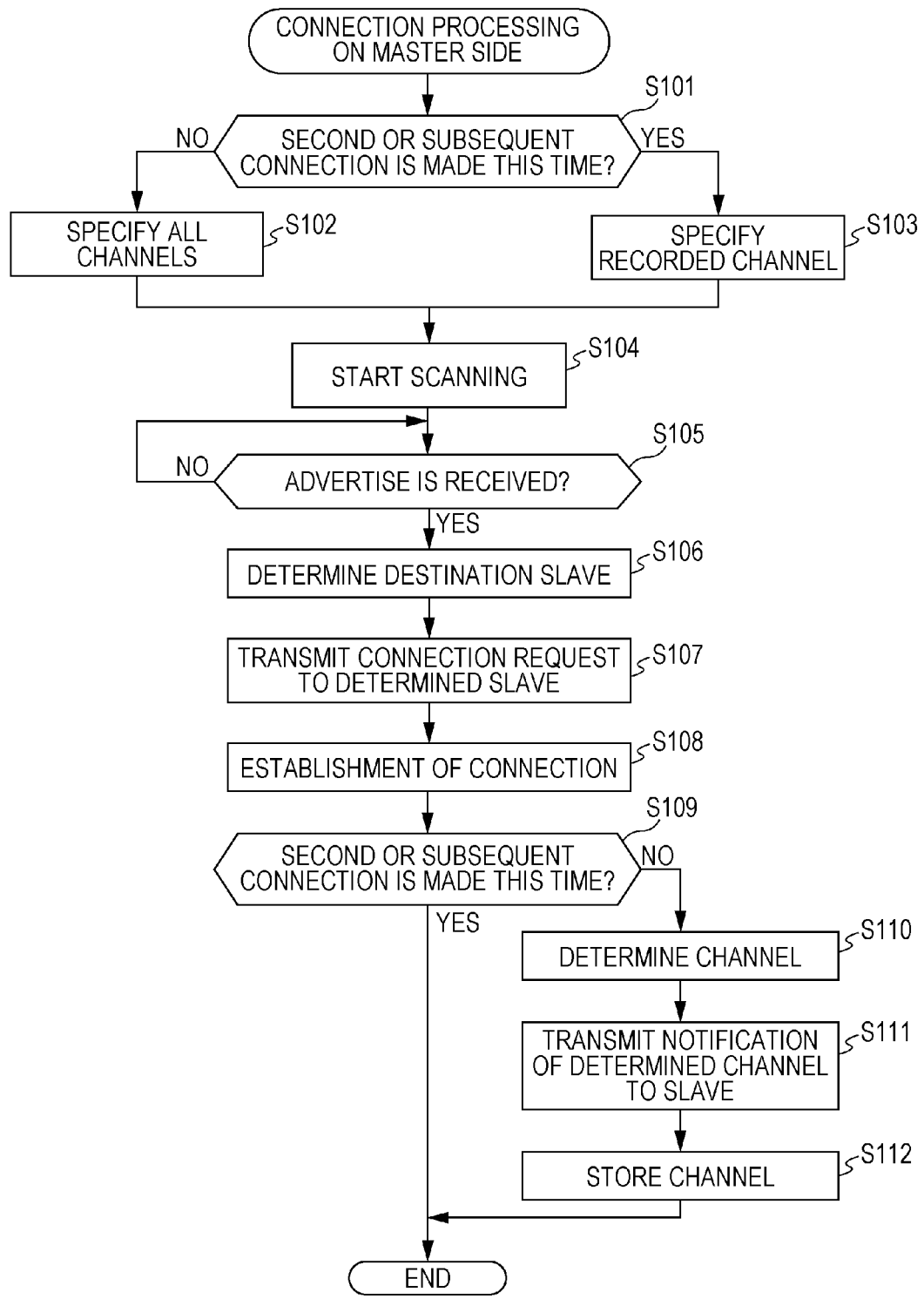
FIG. 7 is a flowchart illustrating exemplary connection processing on the master side, performed by the master of FIG. 3.

FIG. 7 is a flowchart illustrating exemplary connection processing on the master side, performed by the control unit 102 of the master 100 according to the present embodiment.

It is noted that the connection processing on the master side is performed by the control unit 102 for reading and executing a program stored in the ROM 104 beforehand.

The control unit 102 of the master 100 starts the connection processing on the master side of FIG. 7, for example, when receiving the connection instruction including information of the slave 200 to which the user desires to connect, after application for communication with the slave 200 is started.

First, the connection determination unit 151 determines whether second or subsequent connection is made with the slave 200 to which the user desires to connect this time, based on the received connection instruction (step S101).

Specifically, the connection determination unit 151 references the frequency range table 161, and determines whether the slave 200 to which connection is attempted is recorded in the frequency range table 161.

When the connection determination unit 151 determines that the second or subsequent connection is not made with the slave 200 to which the user desires to connect this time, or the connection is made with the slave 200 for the first time (step S101; No), all of the three advertising channels are specified as the channels used for scanning this time (step S102).

Further, when the connection determination unit 151 determines that the second or subsequent connection is made with the slave 200 to which the user desires to connect this time (step S101; Yes), the frequency range table 161 is referenced, and the channel recorded in association with the slave 200 to which the user desires to connect this time is specified as the channel used for this scanning (step S103).

Next, the first connection establishment unit 152 or the second connection establishment unit 153 starts to scan the slave 200, using the channels or the channel specified in step S102 or step S103 (step S104).

Specifically, when all of the three channels are specified in step S102, the first connection establishment unit 152 starts scanning using the three channels.

Alternatively, when the one channel is specified in step S103, the second connection establishment unit 153 starts scanning using the one channel.

Next, the first connection establishment unit 152 or the second connection establishment unit 153 determines whether the advertise having been transmitted from the slave 200 is received (step S105).

The first connection establishment unit 152 or the second connection establishment unit 153 waits for reception of the advertise from the slave 200 while continuing scanning (step S105; No).

When it is determined that the advertises having been transmitted from the slaves 200 are received (step S105; Yes), the first connection establishment unit 152 or the second connection establishment unit 153 selects, from among the slaves 200 having transmitted the advertises received, the slave 200 to which the user desires to connect this time based on the received connection instruction, to be determined as the slave 200 to be connected this time (step S106).

Next, the first connection establishment unit 152 or the second connection establishment unit 153 transmits the connection request to the slave 200 having been determined in step S106 (step S107), and establishes the connection with the slave 200 (step S108).

Next, the connection determination unit 151 determines whether the second or subsequent connection is made with the slave 200 with which connection has been established this time, similarly to step S101, (step S109).

When it is determined that the second or subsequent connection is made with the slave 200 with which connection has been established this time, (step S109; Yes), the connection determination unit 151 finishes the connection processing on the master side.

When the connection determination unit 151 determines that the second or subsequent connection is not made with the slave 200 with which connection has been established this time, or connection is made with the slave 200 for the first time (step S109; No), the frequency range determination unit 154 selects one channel at random from among the three advertising channels, to be determined as the channel used for the subsequent connection with the slave 200 to which connection has been made this time (step S110).

Next, the frequency range notification unit 155 specifies specific service and characteristics, and transmits notification to the slave 200 to record the channel having been determined in step S110 (step S111).

Further, the frequency range determination unit 154 records, in the frequency range table 161, the channel having been determined in step S110 in association with a slave ID of the slave 200 to which connection has been made this time (step S112).

And then, the connection processing on the master side ends.

After the above-mentioned connection processing on the master side ends, the data communication unit 156 performs transmission and reception of the data between the master 100 and the slave 200 with which connection has been established.

Next, operation of the slave 200 according to the present embodiment will be described with reference to FIG. 8.

Figure 8:
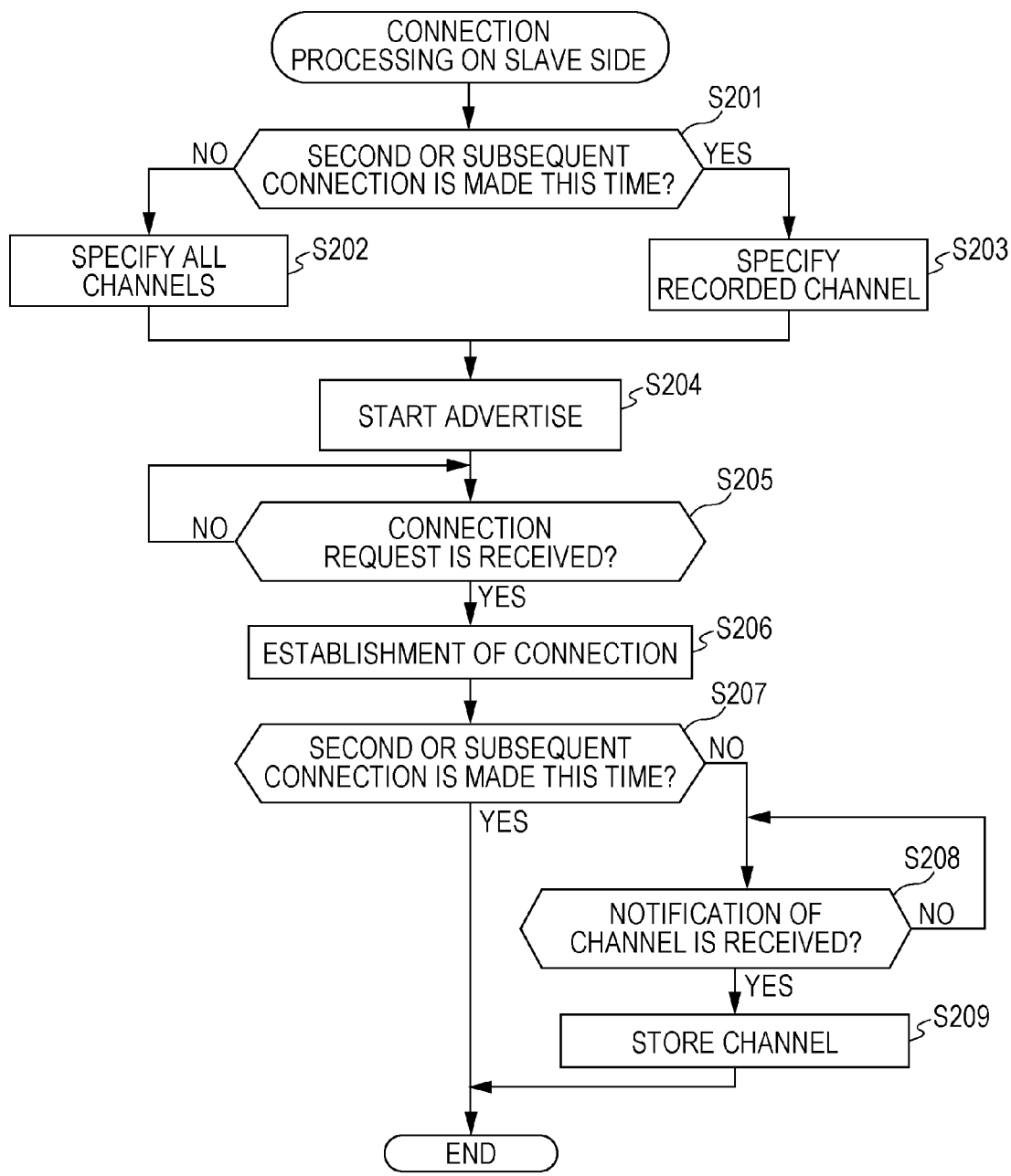
FIG. 8 is a flowchart illustrating exemplary connection processing on the slave side, performed by the slave of FIG. 5.

FIG. 8 is a flowchart representing exemplary connection processing on the slave side performed by the control unit 202 of the slave 200 according to the present embodiment.

It is noted that the connection processing on the slave side is performed by the control unit 202 configured to read and execute the program previously stored in the ROM 204.

For example, after the power is turned on by user operation to the operation unit 220, the control unit 202 of the slave 200 starts the connection processing on the slave side of FIG. 8.

First, the connection determination unit 251 determines whether the second or subsequent connection is made with the master 100 to which connection is attempted (step S201).

Specifically, the connection determination unit 251 references the ROM 204, and determines that the channel used for establishment of the connection, received from the master 100 to which connection is attempted is recorded.

When the connection determination unit 251 determines that the second or subsequent connection is not made with the master 100 to which connection is attempted, or the connection is made with the master 100 for the first time (step S201; No), all of the three advertising channels are specified as the channels used for the advertise this time (step S202).

Further, when the connection determination unit 251 determines that the second or subsequent connection is made with the master 100 to which the slave desires to connect this time (step S201; Yes), the ROM 204 is referenced, and the one channel recorded as the channel used for establishment of the connection with the master 100 is specified as the channel used for the advertise this time (step S203).

Next, the first advertise transmission unit 252 or the second advertise transmission unit 253 starts transmission of the advertise to the master 100, using the channels or the channel specified in step S202 or step S203 (step S204).

Specifically, all of the three channels are specified in step S202, the first advertise transmission unit 252 starts transmission of the advertise using the three channels.

Alternatively, when the one channel is specified in step S203, the second advertise transmission unit 253 starts transmission of the advertise using the one channel.

Next, the connection establishment unit 255 determines whether the connection request having been transmitted from the master 100 is received (step S205).

The connection establishment unit 255 waits for reception of the advertise from the master 100 while continuing the advertise (step S205; No).

When it is determined that the advertise is received from the master 100 (step S205; Yes), the connection establishment unit 255 establishes the connection with the master 100 (step S206).

Next, the connection determination unit 251 determines whether the second or subsequent connection is made with the master 100 with which connection has been established this time, similarly to step S201 (step S207).

When the connection determination unit 251 determines that the second or subsequent connection is made with the master 100 with which connection has been established this time (step S207; Yes), the connection processing on the slave side ends.

When the connection determination unit 251 determines that the second or subsequent connection is not made with the master 100 with which connection has been established this time, or connection is made for the first time (step S207; No), the notification reception unit 254 determines that notification of the channel used for the subsequent connection has been received from the master 100 with which connection has been made this time (step S208).

The notification reception unit 254 waits for the reception of the notification from the master 100 (step S208; No).

When it is determined that the notification of the channel used for the subsequent connection has been received from the master 100 with which connection has been made this time (step S208; Yes), the notification reception unit 254 records, in the ROM 204, the channel used for the subsequent connection, together with the service and characteristics specified in the notification (step S209).

And then, the connection processing on the slave side ends.

After the above-mentioned connection processing on the slave side ends, the data communication unit 256 performs transmission and reception of the data between the slave 200 and the master 100 with which connection has been made.

As described above, when the master 100 according to the embodiment establishes the connection with the slave 200 with which previous connection is not established, one channel is selected, as the channel used for establishment of the subsequent connection, from among three advertising channels, and the slave 200 is notified of the one channel.

Accordingly, the slave 200 transmits the advertise using the one channel previously notified of from the master 100, upon the subsequent connection with the master 100, the master 100 may only scan the one channel.

Therefore, power consumption is reduced to scan the slave 200.

Further, when the connection is established with the master 100 with which previous connection is established, the slave 200 according to the embodiment transmits the advertise using the one channel previously notified of from the master 100.

Accordingly, power consumption is reduced compared with when the advertise is transmitted always using the three advertising channels.

It is to be understood that the present invention is not limited to the embodiment having been described above, but may be practiced with modifications and alterations.

(First Modification)

In the embodiment having been described above, the frequency range determination unit 154 of the master 100 determines one channel at random, as the frequency range used for establishment of subsequent connection with the slave 200, from among the three advertising channels of FIG. 2.

However, the channel determination method performed by the frequency range determination unit 154 is not limited to the embodiment having been described above.

In the present modification, description will be made of another exemplary channel determination method performed by a frequency range determination unit 154, in which one channel is determined from three channels, according to time zones for communication between a master 100 and slaves 200.

It is noted that, in the following description, configurations the same or similar to those of the embodiment having been described above use the same or similar reference signs, and detailed description thereof is omitted.

Figure 9:
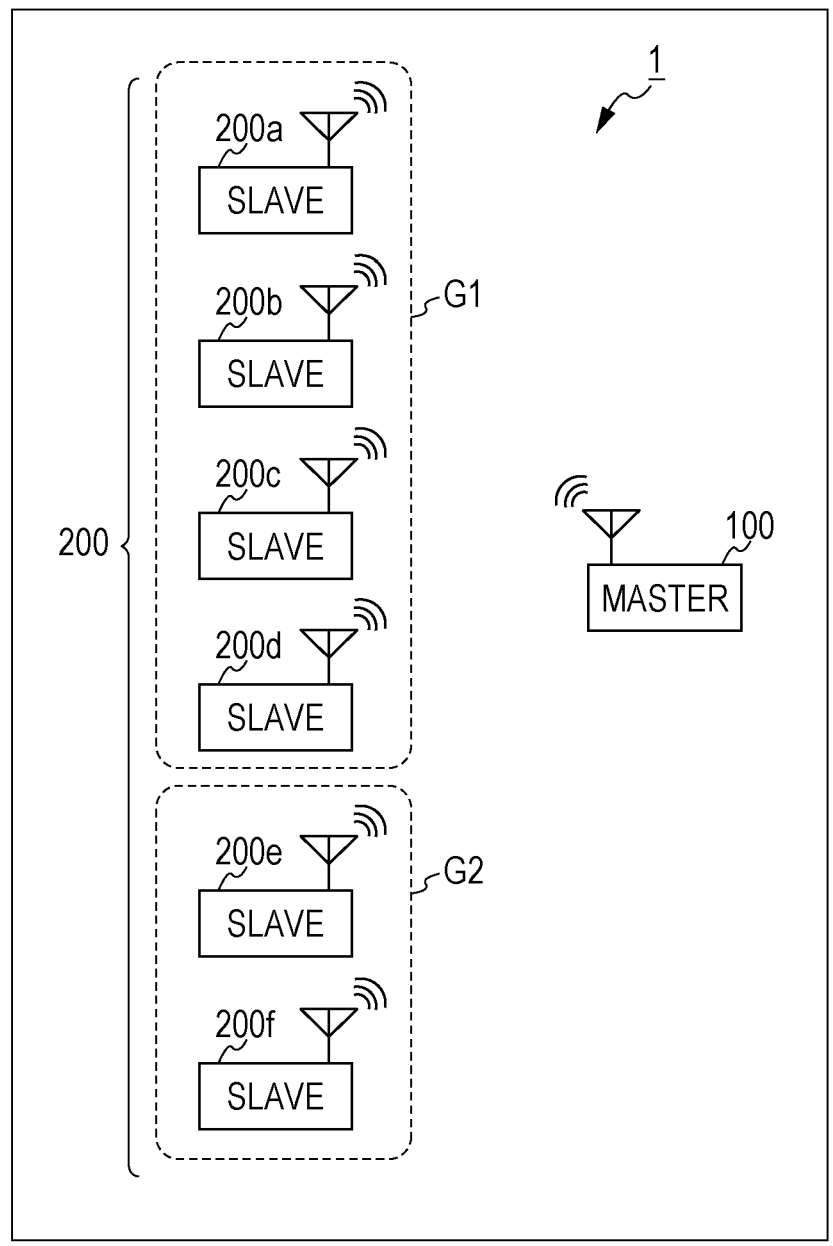
FIG. 9 is a diagram illustrating an exemplary configuration of a wireless communication system according to a first modification.

FIG. 9 is a diagram illustrating an exemplary configuration of a communication system according to a modification of the present invention.

In the exemplary configuration of FIG. 9, similarly to the embodiment of FIG. 1, the wireless communication system 1 includes the master 100 as a wireless communication apparatus, and the plurality of slaves 200 (200a to 200f) as wireless communication apparatuses different from the master 100.

In the present modification, as illustrated in FIG. 10A, the slaves 200a to 200d belong to a group G1.

The slaves 200a to 200d previously establish a connection with the master 100, and have slave IDs associated with channels used for the establishment of the connection with the master 100 to be stored in a frequency range table 171 of the master 100.

Additionally, the slaves 200e and 200f belong to a group G2.

The slaves 200e and 200f are assumed to be newly added to the wireless communication system 1, and have no connection established with the master 100.

FIG. 10A and FIG. 10B are exemplary tables illustrating data stored in frequency range tables 171 according to the present modification.

As illustrated in FIGS. 10A and 10B, the frequency range tables 171 are different from the frequency range table 161 according to the embodiment of FIG. 4 in addition of a use time zone for each slave 200.

The use time zone represents a time zone for communication of the master 100 with the corresponding slave 200.

For example, the master 100 establishes a connection with the slave 200a having a slave ID "200a", using the channel having an index of "37" in the use time zone, "AM 9:00 to 12:00", and makes communication therewith.

It is noted that the use time zone is input to each slave 200, for example, through the user operation to the touch panel 130, and stored in the frequency range table 171.

It is noted that, in an example of the frequency range table 171 of FIG. 10A, the slaves 200a to 200d have previously established connection with the master 100, so that the channels used for establishment of subsequent connection are stored with the slave IDs thereof.

However, the newly added slaves 200e and 200f have no established connection with the master 100, so that the slave IDs thereof, the use time zones, and the channels used for establishment of subsequent connection are not stored.

Further, in an example of the frequency range table 171 of FIG. 10B, the slave IDs of the slaves 200e and 200f, the use time zones, and the channels used for establishment of subsequent connection are stored, after the slaves 200e and 200f have established connection with the master 100, from a state illustrated in FIG. 10A.

Next, description will be made of the channel determination method performed by the frequency range determination unit 154 according to the present modification.

First, as illustrated in FIG. 9, when the slaves 200e and 200f are added to the wireless communication system 1, the slave IDs "200e" and "200f" of the added slaves 200e and 200f, and the use time zones, "PM 3:00 to 6:00" and "PM 3:00 to 6:00", for the slaves 200e and 200f are added to the frequency range table 171, for example, based on input operation by the user.

Next, when the user desires communication with the slave 200e, connection processing on the master side and connection processing on the slave side are performed for first connection according to the embodiment of FIGS. 7 and 8.

In step S110 of the connection processing on the master side of FIG. 7, the frequency range determination unit 154 determines the channel used for establishment of the next connection with the slave 200e based on the use time zone recorded in the frequency range table, in the present modification.

Specifically, the frequency range determination unit 154 references the frequency range table 171 to specify the use time zone for the slave 200e, and the least frequently used channel associated with the slave 200 in the use time zone.

The use time zone for the slave 200e corresponds to "PM 3:00 to 6:00".

In the use time zone, the channel "37" is associated with the slave 200c, and the channels "38" and "39" are not associated with any of the slaves 200.

That is, in the use time zone "PM 3:00 to 6:00", the channels "38" and "39" are the least frequently used channels associated with the slave 200.

The frequency range determination unit 154 determines the specified channels as the channels used for establishment of the next connection with the slave 200e.

It is noted that a plurality of the channels are specified, one channel is selected from the plurality of the channels and determined as the channel used for establishment of the next connection with the slave 200e.

Here, the frequency range determination unit 154 has specified the channels "38" and "39" as the least frequently used channels associated with the slave 200, so that the channel "38" having a smaller index is selected from the two channels, and determined as the channel used for establishment of the next connection with the slave 200e.

In step S112 of FIG. 7, the frequency range determination unit 154 records the determined channel "38" in the frequency range table 171, in association with the slave ID "200e" of the slave 200e, as illustrated in FIG. 10B.

Next, when the user desires communication with the slave 200f, the connection processing on the master side and the connection processing on the slave side are performed for the first connection, according to the embodiment of FIGS. 7 and 8.

In step S110 of the connection processing on the master side of FIG. 7, in the present modification, the frequency range determination unit 154 determines the channel used for establishment of the next connection with the slave 200f based on the use time zone recorded in the frequency range table.

Specifically, the frequency range determination unit 154 references the frequency range table 171 to specify the use time zone of the slave 200f, and the least frequently used channel associated with the slave 200 in the use time zone.

The use time zone for the slave 200f corresponds to "PM 3:00 to 6:00".

In the use time zone, the channels "37" and "38" are associated with the slaves 200c and 200e, respectively, and the channel "39" is not associated with any of the slaves 200.

That is, in the use time zone "PM 3:00 to 6:00", the channel "39" are the least frequently used channels associated with the slave 200.

And then, the frequency range determination unit 154 determines the specified channel as the channel used for establishment of the next connection with the slave 200f.

It is noted that a plurality of the channels are specified, one channel is selected from the plurality of the channels and determined as the channel used for establishment of the next connection with the slave 200f.

Here, the frequency range determination unit 154 has specified only the channel "39" as the least frequently used channel associated with the slave 200, so that the channel "39" is determined as the channel used for establishment of the next connection with the slave 200f.

In step S112 of FIG. 7, the frequency range determination unit 154 records the determined channel "39" in the frequency range table 171, in association with the slave ID "200f" of the slave 200f, as illustrated in FIG. 10B.

As described above, in step S111 of FIG. 7, the slave 200 is notified of the channel determined by the frequency range determination unit 154 by a frequency range notification unit 155, and the channel is used for establishment of the subsequent connection, similarly to the embodiment having been described above.

In the configuration of the present modification having been described above, when the channel is determined, the master 100 assigns, based on the use time zone of each slave 200, the channel less frequently used as the channel used for establishment of the subsequent connection with the slave 200 with which new connection has been established.

As described above, the channel is assigned for each time zone, without deviation in the channel to be used, so that heavy traffic in a specific channel is inhibited.

(Second Modification)

As another example of the channel determination method performed by the frequency range determination unit 154, one channel may be determined from among the three channels according to an application function used by the master 100 to perform communication with the slave 200.

Specifically, instead of the use time zone, the master 100 stores the application function used for communication with the corresponding slave 200, in the frequency range table 171 according to the first modification.

Here, the application function is, for example, to collect data from the slave 200 and upload the collected data.

The master 100 references the frequency range table 171 to assign the channel less frequently used in the same or similar function, as the channel used for establishment of the subsequent connection with the slave 200 with which new connection has been established, based on the application function corresponding to each slave 200.

As described above, when a plurality of applications has the same or similar operation, the channels are assigned to the plurality of applications so that the channels are used without deviation, and thus heavy traffic in a specific channel is inhibited.

Although the embodiment of the present invention and the modifications thereof have been described above, the present invention is not limited to the embodiment and modifications thereof.

In the embodiment having been described above, although the smartphone is employed as the master, the wireless communication apparatus as the master is not limited to the smartphone.

For example, a wristwatch or the like capable of wireless communication based on BLE may be employed as the master, and a smartphone, a mobile phone, or the like having an e-mail reception function may be employed as the slave.

In the embodiment having been described above, as illustrated in FIG. 1, the wireless communication system 1 includes the one master 100 and the four slaves 200.

However, the wireless communication system 1 may include one or more masters and one or more slaves.

Further, in the embodiment and the modifications thereof, the frequency range determination unit 154 determines one channel from among the three advertising channels of FIG. 2.

However, the number of channels determined by the frequency range determination unit 154 is not limited to one, and for example, two channels may be determined That is, the frequency range determination unit 154 may only determine the channels less than three from among the three advertising channels of FIG. 2.

Therefore, power consumption is reduced compared with when the three channels are always scanned.

Further, in the slave 200, the number of channels used by the second advertise transmission unit 253 to transmit the advertise is not limited to one, and when two channels are notified of from the master 100, the advertise may be transmitted using the two channels.

Therefore, power consumption is reduced compared with when the advertise is transmitted always using the three channels.

Further, the master 100 and the slave 200 according to the embodiment of the present invention can be practiced using a normal computer system without a dedicated apparatus.

The functions of the master 100 and the slave 200 may be performed, for example, by executing a program on a computer.

The program for performing the functions of the master 100 and the slave 200 may be stored in a computer-readable recording medium, such as a universal serial bus (USB) memory, a secure digital (SD) memory card, a compact disc read only memory (CD-ROM), a digital versatile disc (DVD), a Blu-ray (registered trademark) disc (BD), or a hard disk drive (HDD), or may be downloaded to the computer through a network. Further, the control unit 102 may include one CPU, or include a plurality of processing units to implement the embodiment.

Although the preferred embodiment of the present invention has been described above, the present invention is not limited to such a specific embodiment, but the scope of the invention is indicated by the appended claims, and all changes that fall within the scope of equivalents are intended to be embraced therein.

What is claimed is:

1. A wireless communication apparatus for performing wireless communication with another wireless communication apparatus, comprising:
    a communication unit configured to receive identification information from the another wireless communication apparatus configured to transmit the identification information in predetermined N frequency ranges (N is a natural number equal to or more than 2 and less than the number of frequency ranges for communication), and establish connection with the another wireless communication apparatus; and
    a control unit configured to determine M frequency ranges (M is a natural number less than N) from among the predetermined N frequency ranges, as a frequency range used for establishment of subsequent connection with the another wireless communication apparatus, after the connection with the another wireless communication apparatus has been established by the communication unit,
    wherein the communication unit notifies the another wireless communication apparatus of the determined frequency range, receives the identification information from the another wireless communication apparatus, in the determined frequency range, and establishes the connection with the another wireless communication apparatus.

2. The wireless communication apparatus according to claim 1, wherein
    the wireless communication apparatus wirelessly communicates with a plurality of other wireless communication apparatuses,
    the wireless communication apparatus further includes
        a storage unit configured to store time zones for communication, and the determined frequency ranges in association with each other, for the plurality of other wireless communication apparatuses, respectively, and
    after the connection has been established with one of other wireless communication apparatuses without a frequency range stored in the storage unit, the control unit determines a frequency range having been stored in the storage unit and the least frequently used in association with the other wireless communication apparatuses, in a time zone for communication of the one of other wireless communication apparatuses with the wireless communication apparatus.

3. The wireless communication apparatus according to claim 1, wherein
    the wireless communication apparatus wirelessly communicates with a plurality of other wireless communication apparatuses,
    the wireless communication apparatus further includes
        the storage unit configured to store application functions, and frequency ranges determined by the control unit in association with each other, for the plurality of other wireless communication apparatuses, respectively, and
    after the connection has been established with one of other wireless communication apparatuses without a frequency range stored in the storage unit, the control unit determines a frequency range having been stored in the storage unit and the least frequently used in association with the plurality of other wireless communication apparatuses, in the application function using communication between the one of other wireless communication apparatuses and the wireless communication apparatus.

4. The wireless communication apparatus according to claim 1, wherein
    after the connection has been established with the one of other wireless communication apparatus, the communication unit transmits and receives data in frequency ranges other than the plurality of frequency ranges.

5. The wireless communication apparatus according to claim 1, wherein a plurality of control units are employed.

6. A wireless communication apparatus for performing wireless communication with another wireless communication apparatus, comprising
    a communication unit configured to
    (1) transmit identification information in a predetermined N frequency ranges (N is a natural number equal to or more than 2 and less than the number of frequency ranges for communication),
    (2) receive notification specifying M frequency ranges (M is a natural number less than N) selected from among the N frequency ranges, from the another wireless communication apparatus having received the transmitted identification information, and
    (3) transmit the identification information to the another wireless communication apparatus, in the received frequency ranges specified in the received notification.

7. A wireless communication method performed by a wireless communication apparatus for performing wireless communication with another wireless communication apparatus, comprising:
- a first connection establishment step of receiving identification information from the another wireless communication apparatus for transmitting the identification information in predetermined N frequency ranges (N is a natural number equal to or more than 2 and less than the number of frequency ranges for communication), and establishing connection with the another wireless communication apparatus;
- a frequency range determination step of determining M frequency ranges (M is a natural number less than N) from among the predetermined N frequency ranges, as frequency ranges used for establishment of subsequent connection with the another wireless communication apparatus, after the connection with the another wireless communication apparatus has been established;
- a frequency range notification step of notifying the another wireless communication apparatus having established connection in the first connection establishment step, of the determined frequency ranges; and
- a second connection establishment step of receiving the identification information from the another wireless communication apparatus, in the frequency ranges having been determined in the frequency range determination step, and establishing the connection with the another wireless communication apparatus.

8. A wireless communication method performed by a wireless communication apparatus for performing wireless communication with another wireless communication apparatus, comprising:
- a first identification information transmission step of transmitting identification information in predetermined N frequency ranges (N is a natural number equal to or more than 2 and less than the number of frequency ranges for communication);
- a notification reception step of receiving notification specifying M frequency ranges (M is a natural number less than N) selected from the N frequency ranges, from the another wireless communication apparatus having received the identification information; and
- a second identification information transmission step of transmitting the identification information to the another wireless communication apparatus in the frequency ranges specified in the notification.

9. A non-transitory computer-readable recording medium storing a program for causing a computer to execute:
- a first connection establishment process for receiving identification information from a wireless communication apparatus for transmitting the identification information in predetermined N frequency ranges (N is a natural number equal to or more than 2 and less than the number of frequency ranges for communication), and establishing connection with the wireless communication apparatus;
- a frequency range determination process for determining M frequency ranges (M is a natural number less than N) from among the predetermined N frequency ranges, as frequency ranges used for establishment of subsequent connection with the wireless communication apparatus, after the connection with the wireless communication apparatus has been established in the first connection establishment process;
- a frequency range notification process for notifying the wireless communication apparatus having the connection established in the first connection establishment process, of the determined frequency ranges; and
- a second connection establishment process for receiving the identification information from the wireless communication apparatus in the determined frequency ranges, and establishing the connection with the wireless communication apparatus.

10. A non-transitory computer-readable recording medium storing a program for causing a computer to execute:
- a first identification information transmission process for transmitting identification information in predetermined N frequency ranges (N is a natural number equal to or more than 2 and less than the number of frequency ranges for communication);
- a notification reception process for receiving notification specifying M frequency ranges (M is a natural number less than N) selected from among the N frequency ranges, from the wireless communication apparatus having received the identification information; and
- a second identification information transmission process for transmitting the identification information to the wireless communication apparatus, in the frequency ranges specified in the notification.

11. A master for performing wireless communication with a slave based on Bluetooth (registered trademark) low energy, comprising:
- a communication unit configured to receive an advertise from the slave configured to transmit the advertise in three frequency ranges, and establish connection with the slave; and
- a control unit configured to determine M frequency ranges (M is a natural number less than 3) selected from the three frequency ranges, as frequency ranges used for establishment of subsequent connection with the slave, after connection with the slave has been established,
- wherein, the communication unit notifies the slave of the determined frequency ranges, receives the advertise from the slave in the frequency ranges, and establishes the connection with the slave.

12. A slave for performing wireless communication with a master based on Bluetooth (registered trademark) low energy, comprising:
- a communication unit configured to:
    (1) transmit an advertise in three frequency ranges;
    (2) receive, from the master having received the advertise, notification specifying M frequency ranges (M is a natural number less than 3) selected from the three frequency ranges; and
    (3) transmit the advertise to the master, in the frequency ranges specified in the notification.

* * * * *

UNITED STATES PATENT AND TRADEMARK OFFICE
CERTIFICATE OF CORRECTION

PATENT NO. : 9,491,787 B2  
APPLICATION NO. : 14/558126  
DATED : November 8, 2016  
INVENTOR(S) : Toshihiro Takahashi et al.

Page 1 of 1

It is certified that error appears in the above-identified patent and that said Letters Patent is hereby corrected as shown below:

On the Title Page

Column 2, item (56), change "8,745,246" to --8,745,248--.

Column 2, item (57) Abstract, Line 9, after "notified" delete "of".

Signed and Sealed this
Fourteenth Day of February, 2017

Michelle K. Lee
*Director of the United States Patent and Trademark Office*